United States Patent [19]
Takayama

[11] Patent Number: 5,506,822
[45] Date of Patent: Apr. 9, 1996

[54] AUDIO SIGNAL REPRODUCING APPARATUS HAVING NOISE REDUCING FUNCTION

[75] Inventor: Makoto Takayama, Kanagawa, Japan

[73] Assignee: Canon Kabushiki Kaisha, Tokyo, Japan

[21] Appl. No.: 273,970

[22] Filed: Jul. 12, 1994

Related U.S. Application Data

[63] Continuation of Ser. No. 121,171, Sep. 13, 1993, abandoned, which is a continuation of Ser. No. 473,304, Jan. 31, 1990, abandoned.

[30] Foreign Application Priority Data

Feb. 8, 1989 [JP] Japan .................................... 1-27643

[51] Int. Cl.⁶ .................................................. H04N 5/928
[52] U.S. Cl. .................... 369/32; 369/3; 369/4; 358/343
[58] Field of Search .................. 358/335, 341, 358/343; 360/19.1, 32; 369/2, 3, 4, 8, 32, 59, 60, 124; 381/63

[56] References Cited

U.S. PATENT DOCUMENTS

4,731,835  3/1988  Futamase et al. .................... 381/63
4,841,382  6/1989  Sasaki et al. ........................ 360/32

*Primary Examiner*—Tommy P. Chin
*Assistant Examiner*—Huy Nguyen
*Attorney, Agent, or Firm*—Robin, Blecker, Daley and Driscoll

[57] ABSTRACT

An apparatus for reproducing an audio signal recorded on a recording medium is arranged to store the audio signal reproduced from the recording medium; and to compute and process the stored audio signal and an audio signal which is repeatedly reproduced from the recording medium. The arrangement enables the apparatus to suppress a noise component generated while the audio signal is reproduced, so that the S/N ratio of the reproduced audio signal can be improved.

6 Claims, 7 Drawing Sheets

AUDIO SIGNAL REPRODUCING APPARATUS HAVING NOISE REDUCING FUNCTION

BACKGROUND OF THE INVENTION

1. Field of the Invention

This is a continuation under 37 CFR 1.62 of prior application Ser. No. 08/121,171, filed Sep. 13, 1993, now abandoned, which is a continuation of Ser. No. 07/473,304, filed Jan. 31, 1990, abandoned.

This invention relates to an audio signal reproducing apparatus for reproducing an audio signal recorded on a recording medium.

2. Description of the Related Art

The conventional recording and reproducing apparatuses include an electronic still video system. The electronic still video system is arranged to record either a still image signal or an audio signal on a magnetic disc called a video floppy disc.

More specifically, one field amount of a still image signal is recorded in each of circular tracks on the video floppy disc. As regards the audio signal, the signal is time-base compressed into the same frequency band as the frequency band of the still image signal by a digital signal processing technique and is recorded by the same recording system that is used for recording the still video signal.

FIG. 1 of the accompanying drawings shows in outline the arrangement of an audio signal recording system of the conventional still video system arranged to operate in the above-stated recording method.

Referring to FIG. 1, an audio signal is supplied through an input terminal 1 to a time-base compression circuit 2. The time-base compression circuit 2 consists of an analog-to-digital (hereinafter referred to as A/D) converter 3, a memory 4 and a digital-to-analog (hereinafter referred to as D/A)converter 5. The audio signal is converted into a digital signal by the A/D converter 3 and is stored by the memory 4. The digital audio signal stored by the memory 4 is read out in such a way as to have the same frequency band as the frequency band of a still image signal under the control of a control circuit 10. The digital audio signal thus read out from the memory 4 is converted into an analog audio signal by the D/A converter 5. The audio signal is then output from the time-base compression circuit 2 in a state of having the same frequency band as a still image signal. The audio signal is then supplied to a recording signal processing circuit 6 to be subjected to a given recording signal processing action. After processing by the circuit 6, the audio signal is recorded by a magnetic head 7 in a track on a video floppy disc 8 which is rotated by a motor 9.

FIG. 2 shows in outline the arrangement of an audio signal reproducing system of the conventional still video system. Referring to FIG. 2, a signal is reproduced by a magnetic head 7 from a video floppy disc 8 which is rotated by a motor 9. The reproduced signal is supplied to a reproduced signal processing circuit 11 to be restored to an audio signal having the same frequency band as the frequency band of a still image signal. The audio signal is then supplied to a time-base expansion circuit 12. The time-base expansion circuit 12 consists of an A/D converter 13, a memory 14 and a D/A converter 15. The signal output from the reproduced signal processing circuit 11 is converted into a digital audio signal by the A/D converter 13. The digital audio signal is stored by the memory 14. The audio signal stored in the memory 14 is read out under the control of a control circuit 10 at such a rate that the signal read out is of the same frequency band as that of the original audio signal. The digital audio signal thus read out is supplied to the D/A converter 15 to be converted into an analog audio signal and is then output from an output terminal 17.

However, the conventional still video system which is arranged as described above causes the audio signal to be deteriorated, in respect to an S/N (signal-to-noise) ratio in particular, during the processes of recording and reproducing the audio signal on and from the video floppy disc. Further, considering the possibility of that an audio signal record on one video floppy disc is subjected to dubbing on another video floppy disc, the deterioration in the S/N ratio must be prevented by some means. If not, high-quality dubbing is impossible.

SUMMARY OF THE INVENTION

It is a general object of this invention to provide an audio signal reproducing apparatus which is capable of solving the above-stated problem.

It is a more specific object of the invention to provide an audio signal reproducing apparatus which is arranged to be capable of giving an audio signal with a good S/N ratio by suppressing any noise component that is generated during the process of reproduction.

Under this object, an audio signal reproducing apparatus which is arranged according to this invention to reproduce an audio signal recorded on a recording medium comprises: storing means for storing an audio signal reproduced from the recording medium; and computing means for performing a computing process on an audio signal repeatedly reproduced from the recording medium and an audio signal stored by the storing means.

It is another object of the invention to provide an audio signal reproducing apparatus which is capable of giving a high-quality reproduced audio signal with a simple arrangement.

Under that object, an audio signal reproducing apparatus for reproducing an audio signal recorded on a recording medium is arranged according to this invention to comprise: storing means for storing an audio signal reproduced from the recording medium; computing means for performing a computing process on an audio signal repeatedly reproduced from the recording medium and an audio signal stored by the storing means and for supplying a signal obtained as a result of the computing process to the storing means; and control means arranged to cause the signal supplied from the computing means to be stored at a first rate by the storing means and to cause the signal stored by the storing means to be read out at a second rate which is lower than the first rate.

These and other object and features of the invention will become apparent from the following detailed description of embodiments thereof taken in connection with the accompanying drawings.

DETAILED DESCRIPTION OF THE PREFERRED EMBODIMENTS

Figure 1:
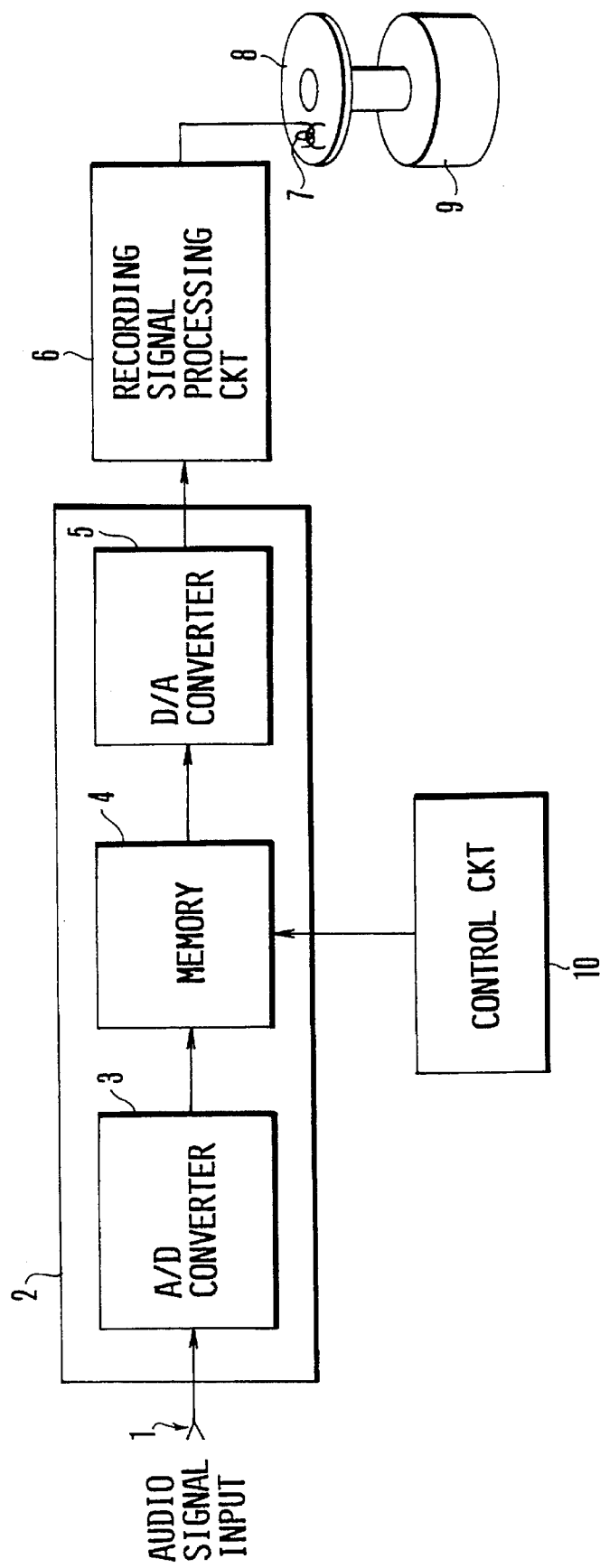
FIG. 1 is a block diagram showing in outline the arrangement of the conventional still video recording system.
Figure 2:
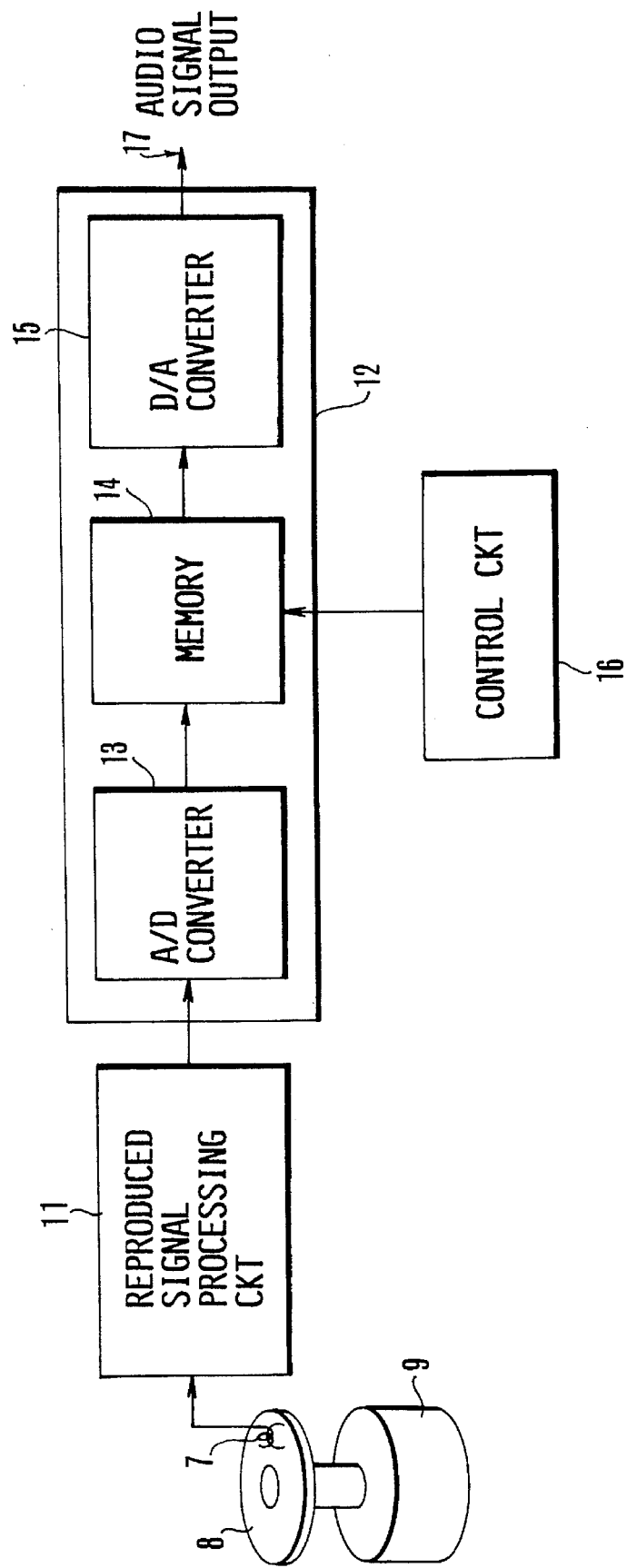
FIG. 2 is a block diagram showing in outline the arrangement of the conventional still video reproducing system.
Figure 3:
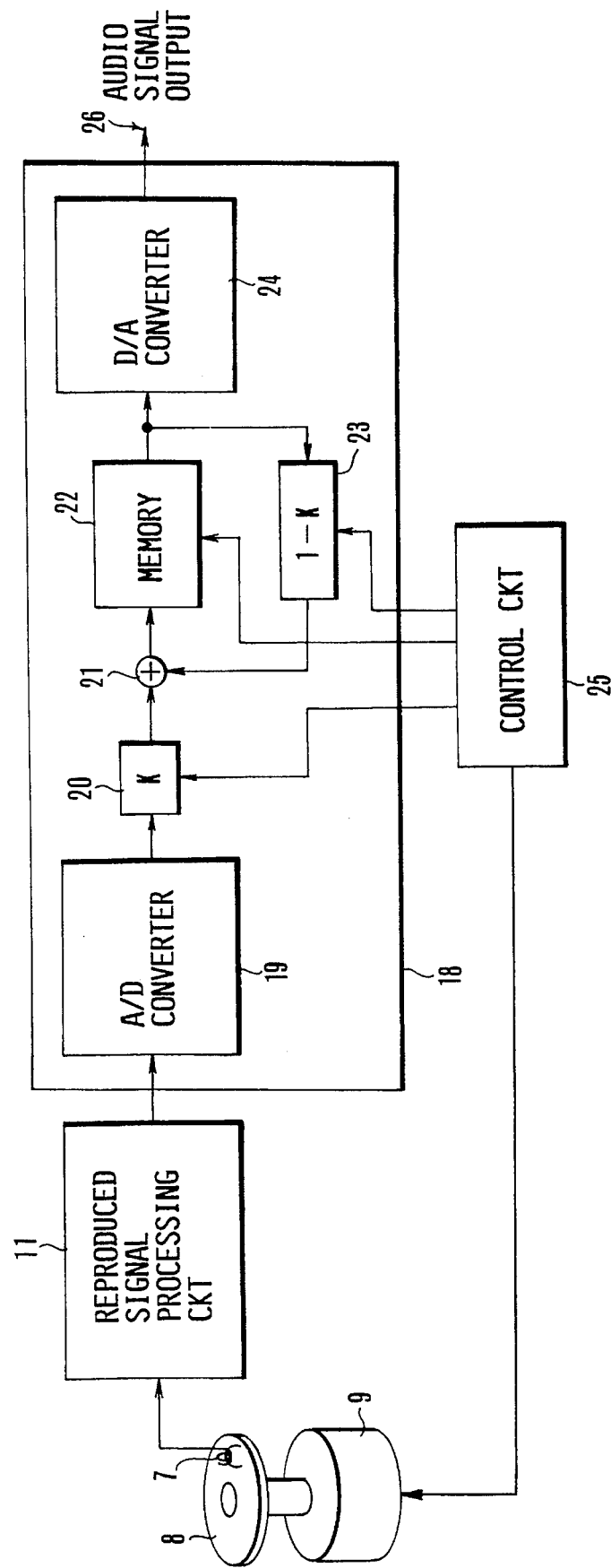
FIG. 3 is a block diagram showing in outline a still video reproducing apparatus which is arranged according to this invention as a first embodiment thereof.

The details of embodiments of this invention are as described below with reference to the drawings:

FIG. 3 shows in outline the arrangement of a still video reproducing apparatus to which this invention is applied as a first embodiment thereof. In FIG. 3, the same component parts as those shown in FIG. 2 are indicated by the same reference numerals and the details of them are omitted from description.

As shown in FIG. 3, a signal output from a reproduced signal processing circuit 11 is supplied to an A/D converter 19 which is disposed within a time-base expansion circuit 18. The signal is converted into a digital audio signal by the A/D converter 19. The digital audio signal is supplied to a coefficient multiplier 20 to be multiplied by a coefficient K, which is a real number less than 1. The digital audio signal output from the coefficient multiplier 20 is supplied to an adder 21. The output of the adder 21 is stored in a memory 22. The digital audio signal output from the memory 22 is supplied to another coefficient multiplier 23 which multiplies the digital audio signal by a coefficient (1−K). The digital audio signal thus multiplied is supplied from the multiplier 23 to the adder 21.

The digital audio signal which is stored at the memory 22 is read out under the control of a control circuit 25 at such a rate as to have the frequency band of an audio signal. The digital audio signal thus read out from the memory 22 is supplied to a D/A converter 24 to be converted into an analog audio signal. The analog audio signal is then output from an output terminal 26.

Figure 4:
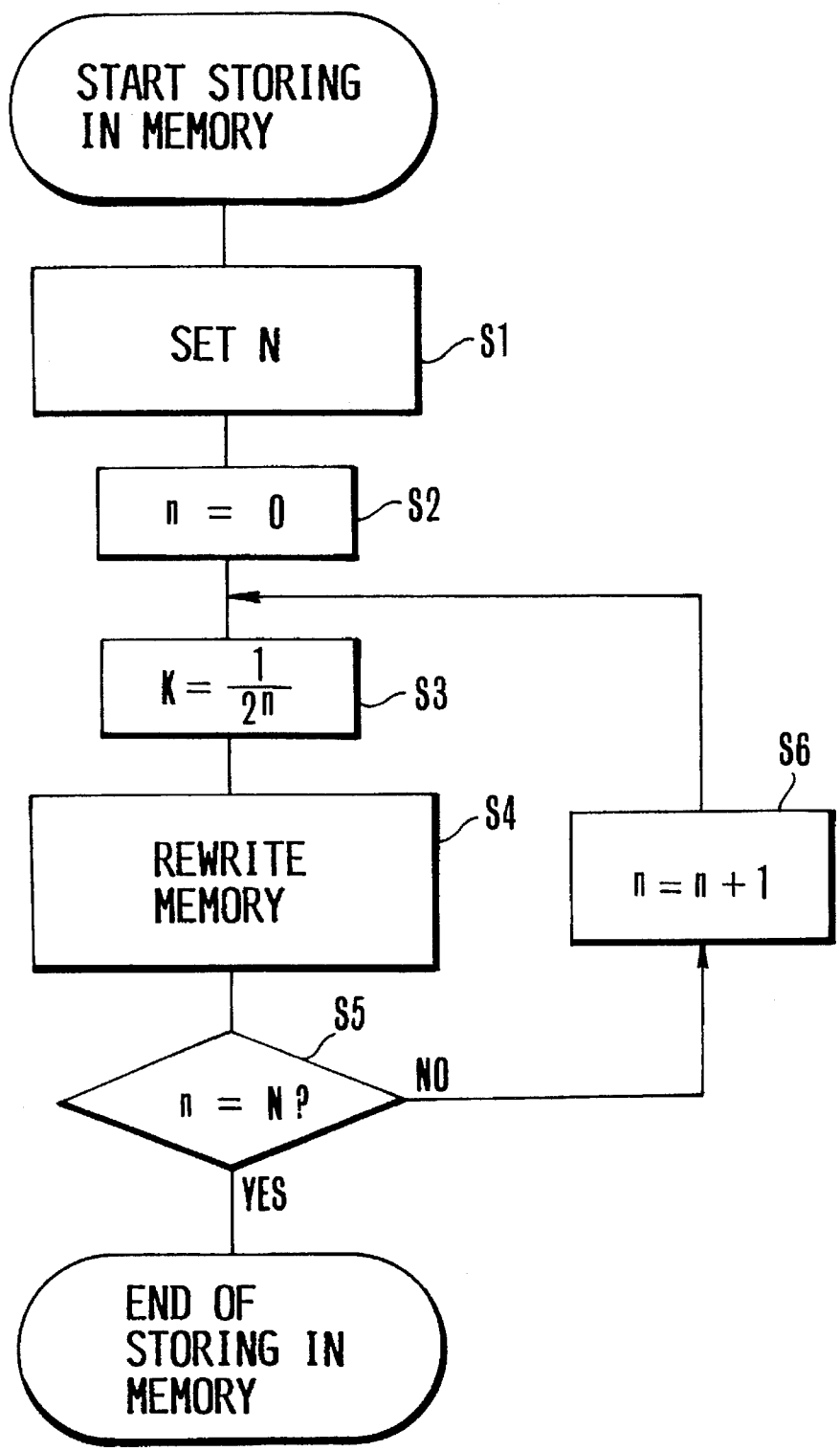
FIG. 4 is a flow chart showing the operating steps of the first embodiment of the invention shown in FIG. 3.

FIG. 4 is a flow chart showing the procedures for an audio signal noise suppressing process to be performed by the apparatus which is arranged as shown in FIG. 3. At a step S1 of the flow chart: When the digital audio signal begins to be stored in the memory 22, the control circuit 25 sets a setting value N (N: a positive integer) at a counter provided within the control circuit 25. At a step S2: The counter is reset to have a counted value n initially set at "0". At a step S3: The value of the coefficient K of the coefficient multiplier 20 is set at ½". Since the counted value n is at "0" in the initial stage, the coefficient K is "1". At a step S4: Therefore, the digital audio signal output from the A/D converter 19 is supplied to the memory 22 to be stored as it is.

Step S5: The control circuit 25 compares the counted value n with the setting value N. If the counted value n is found to be less than the setting value N, the flow of operation comes to a step S6 to have "1" added to the counted value n. In the case of n=1, the value of the coefficient K is set at "½" (Step S3). An audio signal which is reproduced from the same track on the video floppy disc and is digitized is then multiplied by "½" at the coefficient multiplier 20. Meanwhile, the digital audio signal which is read out from the memory 22 is multiplied by "½" at coefficient multiplier 23. The signal output from the coefficient multiplier 20 and the signal output from the coefficient multiplier 23 are added together at the adder 21. As a result, the adder 21 outputs a digital audio signal. Then, the previous digital audio signal which is stored in the memory 22 is replaced with the digital audio signal newly output from the adder 21 (Step S4).

The steps S3 to S4 are repeated in the above-stated manner until the counted value n reaches the setting value N, steps S5 and S6 so directing. When the counted value n is found to have reached the setting value N at the step S5, the action of storing the digital audio signal in the memory 22 comes to an end.

In the first embodiment described above, the output level of the audio signal becomes two times as high as the input level when the setting value N is set at "1", for example. However, since a noise generated during the process of reproduction has no correlation, the output noise signal level becomes $\sqrt{2}$ times as high as the input noise signal level. Therefore, the S/N ratio also becomes $\sqrt{2}$ times as high as that of the input signal. In other words, the S/N ratio is improved by 3 dB or thereabout.

Figure 5:
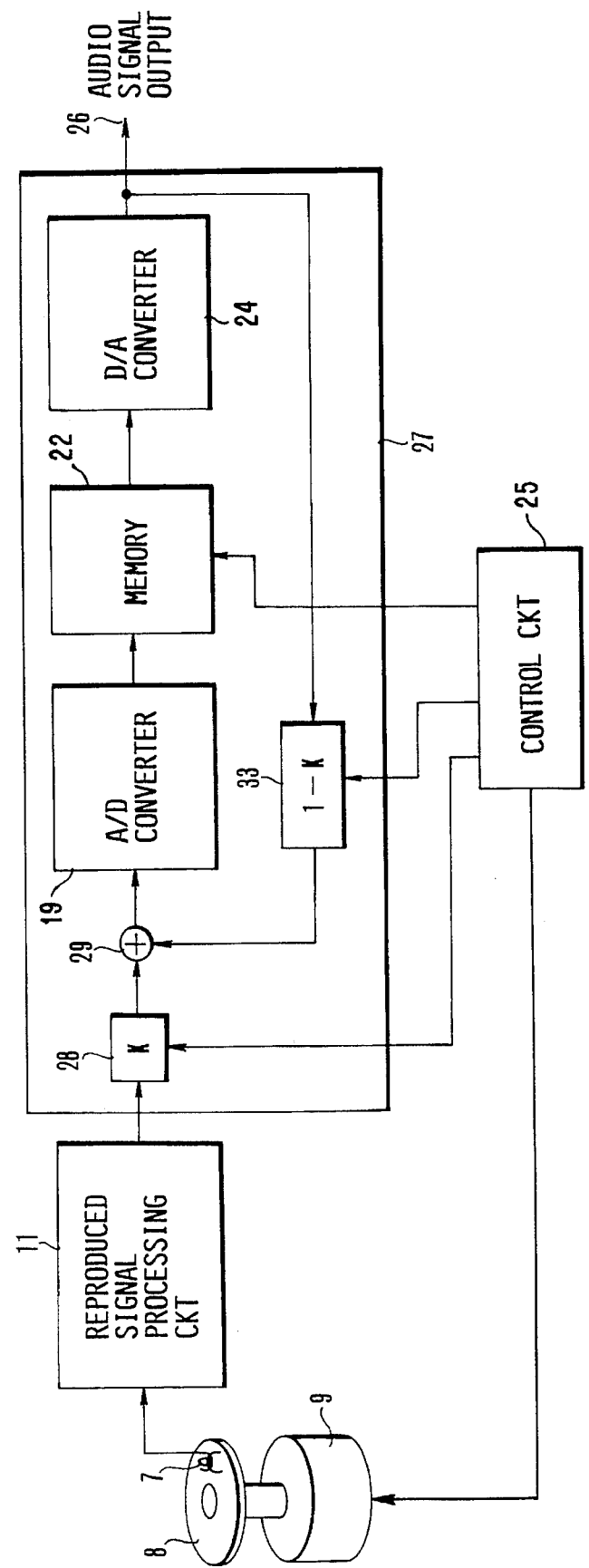
FIG. 5 is a block diagram showing a still video reproducing apparatus arranged according to this invention as a second embodiment thereof.

FIG. 5 shows in outline the arrangement of a still video reproducing apparatus to which this invention is applied as a second embodiment thereof. In the case of the second embodiment shown in FIG. 5, which embodies time-base expansion circuit 27, the coefficient multipliers 20 and 23 and the adder 21 of the first embodiment shown in FIG. 3 are replaced respectively with analog-type coefficient multipliers 28 and 33 and an adder 29, which are arranged to perform coefficient multiplying and adding processes on the audio signal in an analog signal state. The operating procedures of the second embodiment are similar to those shown in the flow chart of FIG. 4.

Figure 6:
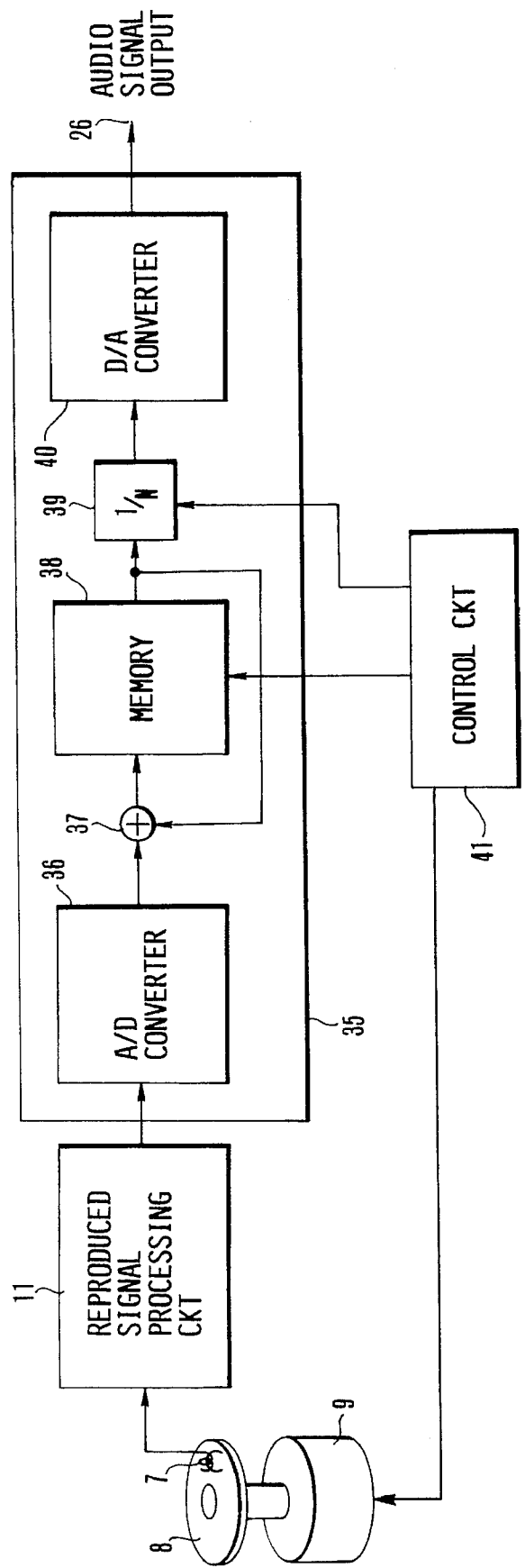
FIG. 6 is a block diagram showing a still video reproducing apparatus arranged according to the invention as a third embodiment thereof.

FIG. 6 shows in outline the arrangement of a still video reproducing apparatus to which this invention is applied as a third embodiment thereof. In the case of the third embodiment shown in FIG. 6, which embodies time-base expansion circuit 35, an audio signal recorded in one and the same track on video floppy disc is repeatedly reproduced N times. Reproduced signals which are obtained by repeating the reproducing action N times are converted to digital format in converter 36, added together in adder 37 and stored in a memory 38. The sum of the reproduced signals stored in the memory 38 is divided into 1/N by an 1/N divider 39 to obtain the average value of the reproduced signals obtained by repeating the reproducing action N times. The divider output is converted to analog format in converter 40.

Figure 7:
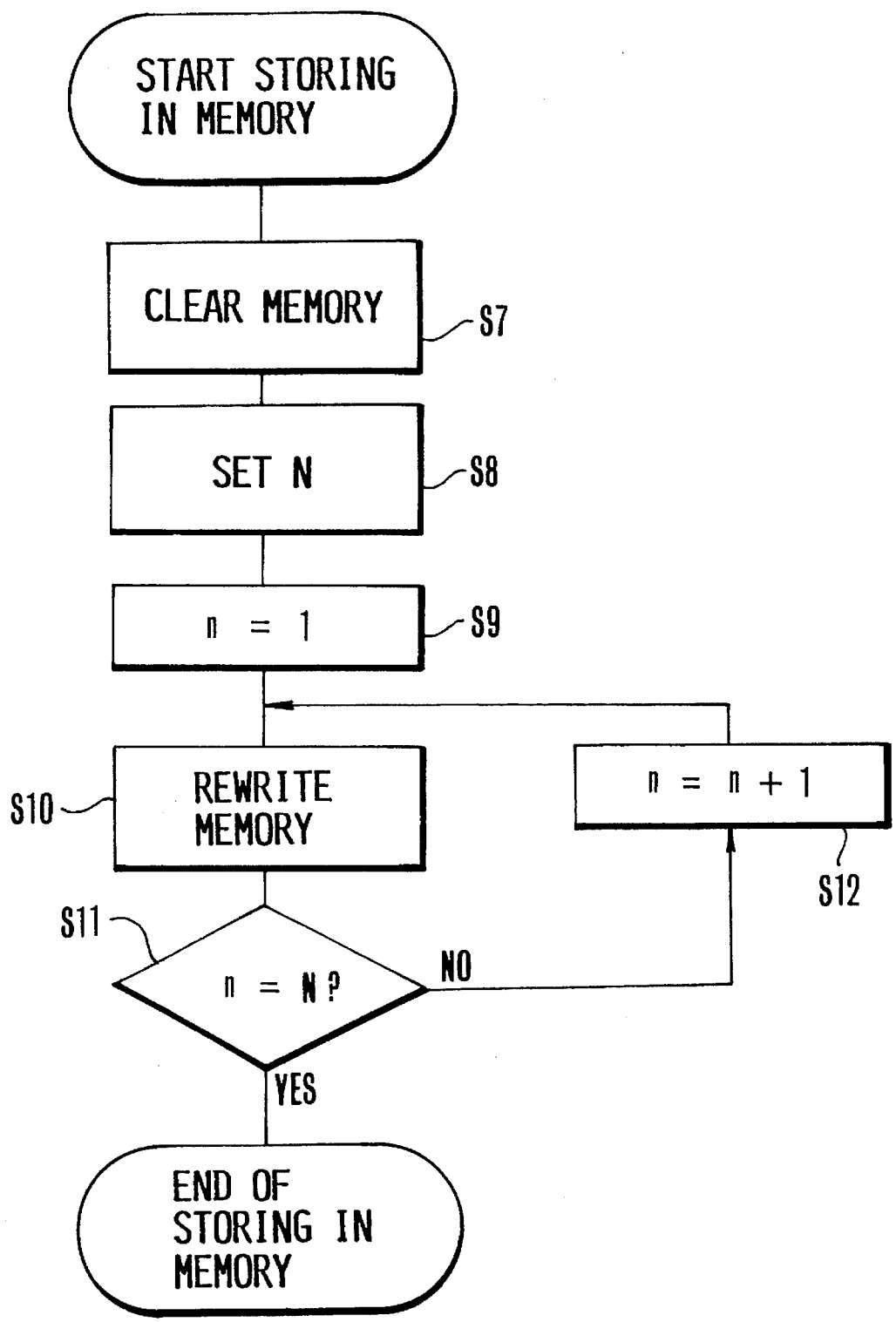
FIG. 7 is a flow chart showing the operating steps of the third embodiment shown in FIG. 6.

The third embodiment includes a control circuit 41 which is arranged to perform a control operation in accordance with procedures which are as shown in a flow chart in FIG. 7. Referring to FIG. 7, when the digital audio signal begins to be stored in the memory 38, the control circuit 41 first clears the content of the memory 38 at a step S7. At a step S8: A given setting value N (N: a positive integer) is set at a counter which is disposed within the control circuit 41. At a step S9: The counted number n of the counter is set at an initial value of "1". At a step S10: Since the counted value n is at "1" in the initial stage, the digital audio signal output from the A/D converter 36 is stored as it is in the memory 38. At a step S11: The control circuit 41 compares the counted value n with the setting value N. If the counted value n is found to have not reached the setting value N, the flow of operation comes to a step S12. At the step S12: "1" is added to the counted value n and the flow comes to the step S10 after the counted value n becomes 2. At the step S10: A digital audio signal which is newly reproduced from the same track on the video floppy disc and is digitized and the previous digital audio signal which is read out from the memory 38 are added together at the adder 37. Then the digital audio signal stored in the memory 38 is replaced with the sum of digital audio signals output from the adder 37. At the step S11: A check is made for n=N. The steps S10, S11 and S12 are repeated until the counted value n reaches the setting value N. When the counted value n is found to have reached the setting value N at the step S11, the process of storing the digital audio signal in the memory 38 comes to an end.

In the third embodiment described above, if the setting value N is set at "2", for example, the output level of the audio signal becomes two times as high as the input level. However, since a noise generated during the process of reproduction has no correlation, the output noise signal level is $\sqrt{2}$ times as high as an input noise signal level. Therefore, the S/N ratio is also $\sqrt{2}$ times as high as the input S/N ratio. In other words, the S/N ratio is improved by 3 dB.

In the case of the third embodiment, the audio signal recorded in one and the same track on the video floppy disc is repeatedly reproduced. During the reproducing operation, audio signals reproduced by repeating the reproducing operation a plurality of times are added together, and the average value of them is obtained by utilizing the memory which is provided for the time-base expanding process. This arrangement enables the embodiment to suppress to a great degree the noise generated during the reproducing operation. Further, since the memory for the time-base expending process is utilized also for the noise suppressing process, the circuit arrangement can be simplified to a great degree.

In each of the embodiments described, the adding and averaging action is arranged to be performed for one track. However, this arrangement may be changed to be performed for a plurality of tracks. Further, in a case where audio signals are recorded in different sectors set by dividing one and the same track, the adding and averaging action may be performed in blocks of an integral number of sectors. In cases where audio signals are recorded in a track which is formed in a spiral shape on a video floppy disc, the adding and averaging action may be performed for each period of unit time.

In accordance with the invented arrangement of the embodiment described, an audio signal recorded on a video floppy disc is repeatedly reproduced. Then, the reproduced audio signals obtained by repeating reproduction are added together and the average value of them is obtained. By virtue of this arrangement, a noise generated during the process of reproduction can be suppressed to a great degree.

What is claimed is:

1. An audio signal reproducing apparatus for reproducing an audio signal recorded on a recording medium, comprising:
    a) reproducing means for repeatedly reproducing the audio signal recorded on said recording medium and outputting the reproduced signal;
    b) storing means for storing the audio signal output from said reproducing means;
    c) first coefficient multiplying means for multiplying by a coefficient K (K being a real number, less than 1) the level of the audio signal output from said reproducing means and for outputting a signal obtained as a result of the multiplying action thereof;
    d) second coefficient multiplying means for multiplying by a coefficient (1−K) the level of the audio signal stored by said storing means and for outputting a signal obtained as a result of the multiplying action thereof; and
    e) addition means for adding together the signal output from said first coefficient multiplying means and the signal output from said second coefficient multiplying means and for outputting a signal obtained as a result of the addition.

2. An apparatus according to claim 1, wherein the audio signal recorded on said recording medium is a time-base compressed audio signal.

3. An audio signal reproducing apparatus comprising:
    a) reproducing means for repeatedly reproducing the audio signal recorded on said recording medium and outputting the reproduced signal;
    b) storing means for storing the audio signal output from said reproducing means;
    c) first coefficient multiplying means for multiplying by a coefficient K (K being a real number, less than 1) the level of the audio signal output from said reproducing means and for outputting a signal obtained as a result of the multiplying action thereof;
    d) second coefficient multiplying means for multiplying by a coefficient (1−K) the level of the audio signal stored by said storing means and for outputting a signal obtained as a result of the multiplying action thereof;
    e) addition means for adding together the signal output from said first coefficient multiplying means and the signal output from said second coefficient multiplying means and for outputting a signal obtained as a result of the addition; and
    f) control means for controlling an audio signal writing/reading out operation of said storing means so as to cause the audio signal output from said addition means to be written into said storing means at a first rate and to cause the signal written in said storing means to be read out at a second rate which is lower than said first rate.

4. An apparatus according to claim 3, wherein the audio signal recorded on said recording medium is a time-base compressed audio signal.

5. An audio signal reproducing apparatus for repeatedly reproducing an audio signal recorded on a track arbitrarily selected from among a plurality of circular tracks concentrically formed on a disc-shaped recording medium, comprising:
    a) reproducing means for repeatedly reproducing the audio signal recorded on the arbitrarily selected track on said disc-shaped recording medium;
    b) storing means for storing the audio signal output from said reproducing means;
    c) first coefficient multiplying means for multiplying by a coefficient K (K being a real number, less than 1) the level of the audio signal output from said reproducing means and for outputting a signal obtained as a result of the multiplying action thereof;
    d) second coefficient multiplying means for multiplying by a coefficient (1−K) the level of the audio signal stored by said storing means and for outputting a signal obtained as a result of the multiplying action thereof;

e) addition means for adding together the signal output from said first coefficient multiplying means and the signal output from said second coefficient multiplying means and for outputting a signal obtained as a result of the addition; and f) coefficient setting means for successively setting the value of the coefficient K in said first and second coefficient multiplying means in accordance with the repeated reproducing number of the audio signal effected when the audio signal recorded in the arbitrarily selected track on said disc-shaped recording medium is repeatedly reproduced by said reproducing means.

6. An apparatus according to claim 5, wherein the audio signal recorded on said recording medium is a time-base compressed audio signal.

* * * * *